(12) United States Patent
Fontenot et al.

(10) Patent No.: US 9,594,559 B2
(45) Date of Patent: Mar. 14, 2017

(54) BINARY FILE FOR COMPUTER PROGRAM HAVING MULTIPLE EXECUTABLE CODE VARIANTS FOR A FUNCTION THAT ARE EXECUTABLE ON A SAME PROCESSOR ARCHITECTURE

(71) Applicant: International Business Machines Corporation, Armonk, NY (US)

(72) Inventors: Nathan Fontenot, Georgetown, TX (US); Fionnuala G. Gunter, Austin, TX (US); Michael T. Strosaker, Austin, TX (US); George C. Wilson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/591,721

(22) Filed: Jan. 7, 2015

(65) Prior Publication Data

US 2016/0196123 A1    Jul. 7, 2016

(51) Int. Cl.
G06F 9/45      (2006.01)
G06F 9/30      (2006.01)
G06F 9/445     (2006.01)

(52) U.S. Cl.
CPC ............ *G06F 9/30058* (2013.01); *G06F 8/41* (2013.01); *G06F 9/44547* (2013.01)

(58) Field of Classification Search
None
See application file for complete search history.

(56) References Cited

U.S. PATENT DOCUMENTS

| 8,136,092 B2* | 3/2012 | Deedwaniya ....... G06F 9/44521 717/140 |
| 2014/0047424 A1 | 2/2014 | Fontenot et al. |

FOREIGN PATENT DOCUMENTS

WO     2014067866 A1    5/2014

* cited by examiner

*Primary Examiner* — Qamrun Nahar
(74) *Attorney, Agent, or Firm* — Steven Bennett

(57) ABSTRACT

Source code for a function of a computer program is compiled by compilers to generate executable code variants for the function according to different optimization approaches. Each executable code variant is executable on a same processor architecture. A binary file for the computer program is constructed that includes each executable code variant. At runtime of the binary file, one of the executable code variants is selected for the function. The selected executable code variant is used during execution of the computer program, until execution is halted.

20 Claims, 4 Drawing Sheets

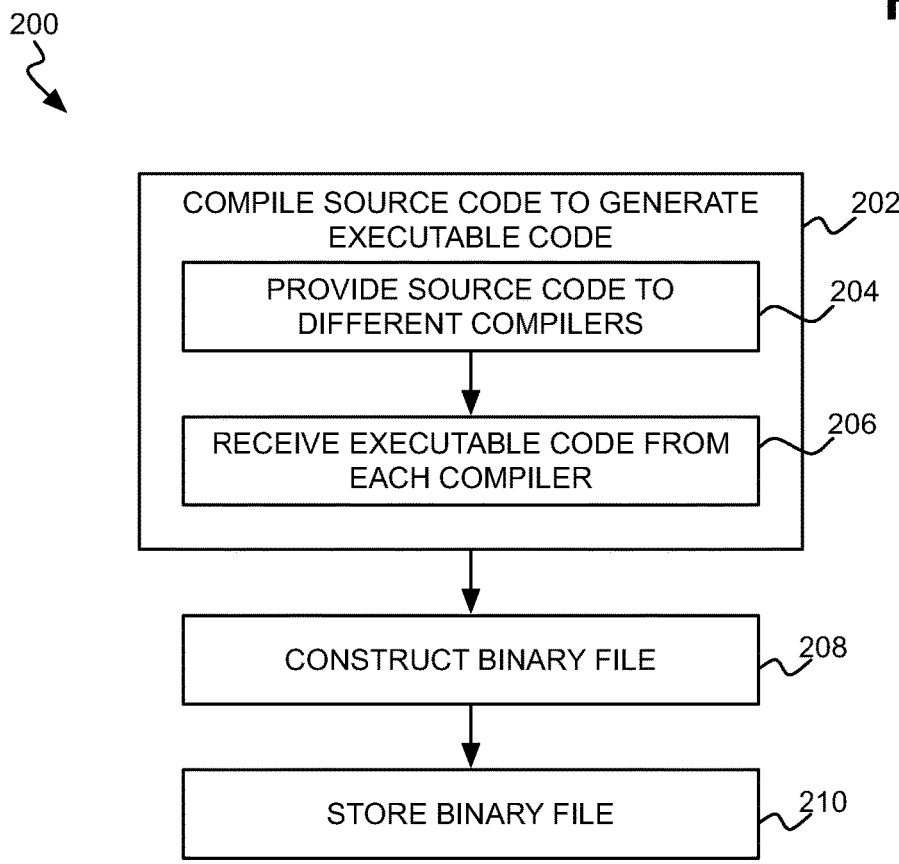

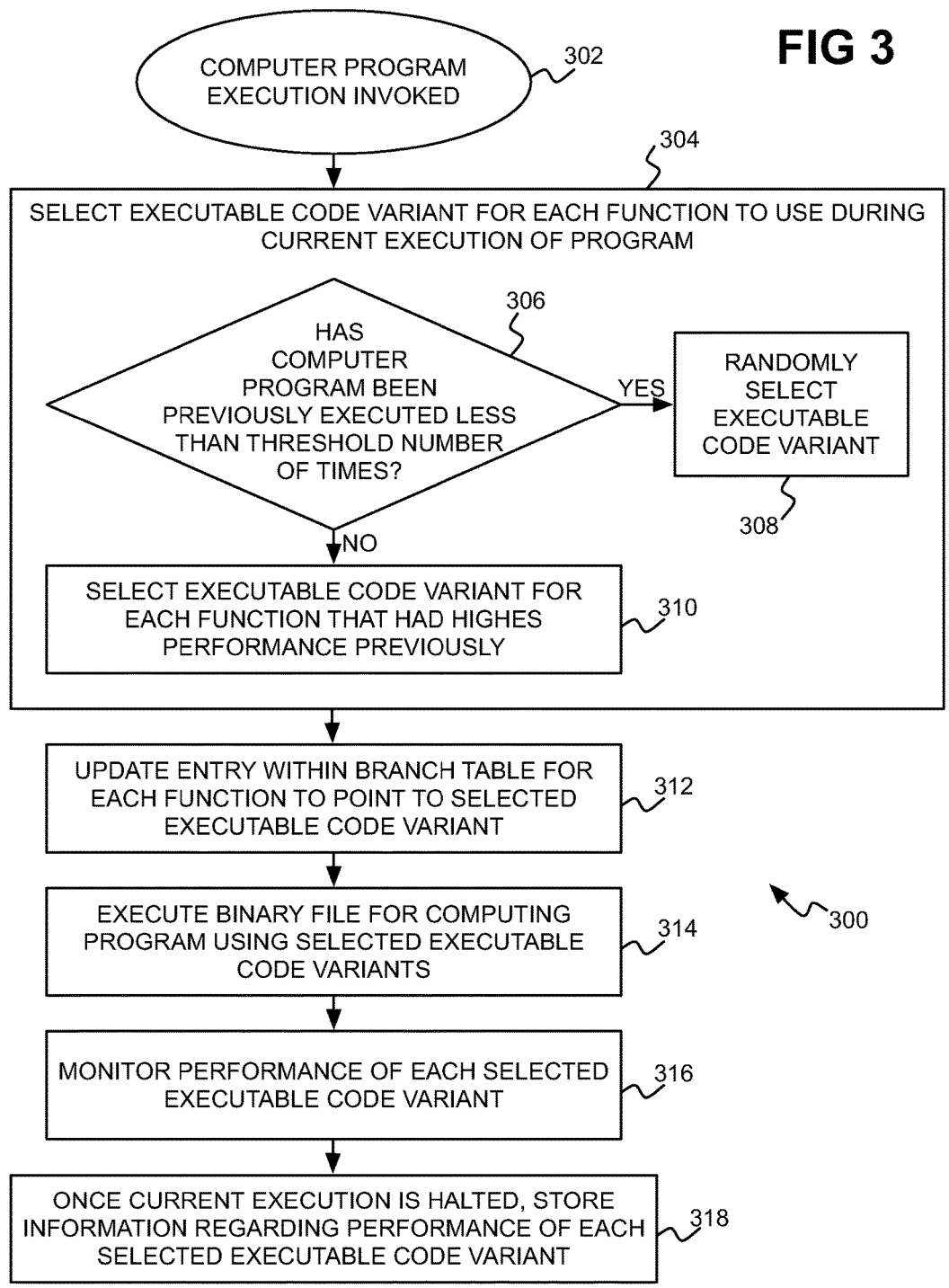

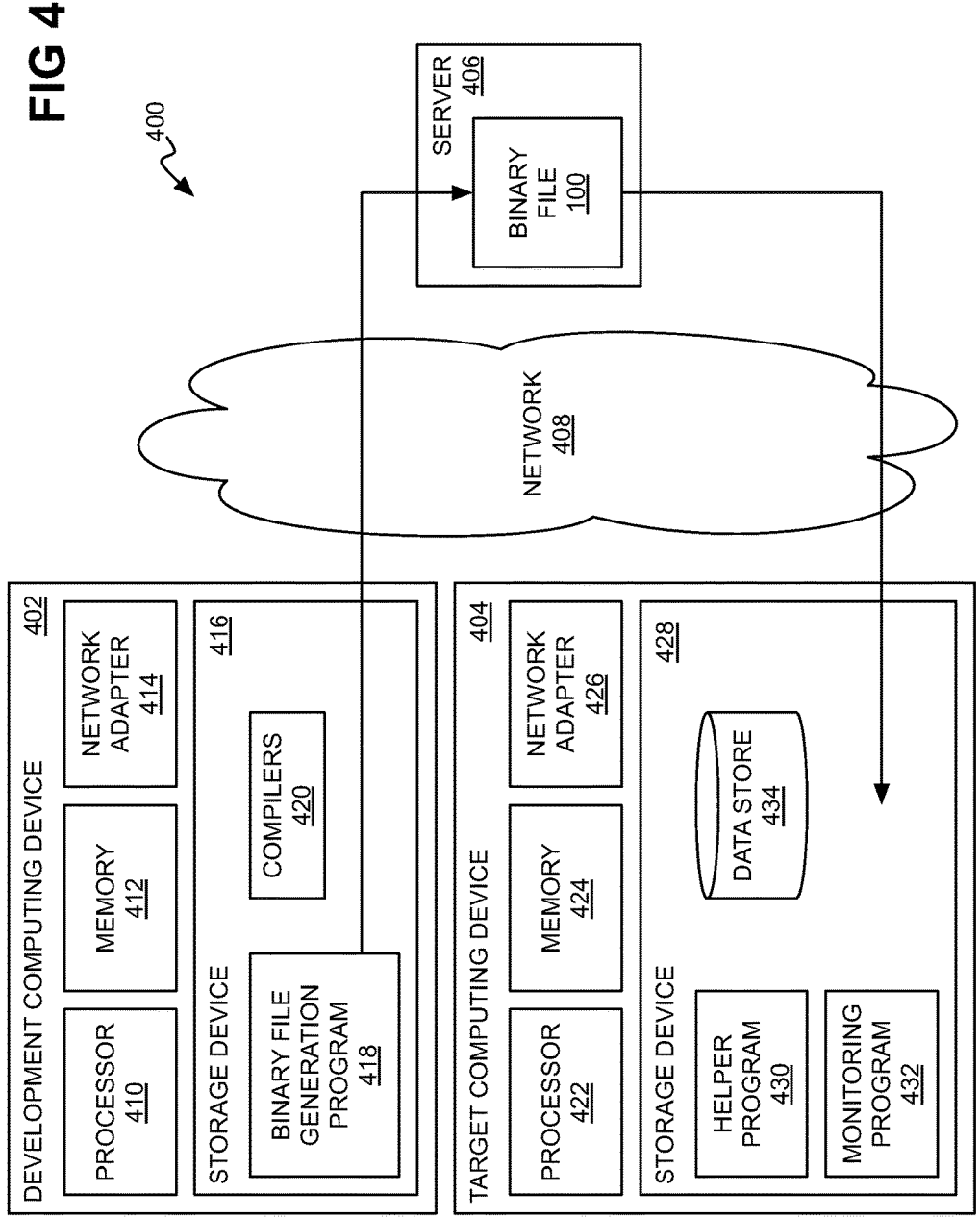

BINARY FILE FOR COMPUTER PROGRAM HAVING MULTIPLE EXECUTABLE CODE VARIANTS FOR A FUNCTION THAT ARE EXECUTABLE ON A SAME PROCESSOR ARCHITECTURE

BACKGROUND

Software developers typically develop computer programs by writing source code in a computer programming language. A processor of a computing device is not able to understand the source code per se, however, and thus cannot execute a computer program directly from its source code. Rather, the source code has be converted to executable code, which may also be referred to as machine code, assembly code, or binary code, which the processor understands. In one methodology, when an end user runs a computer program, an interpreter interprets, or translates, the source code at runtime to executable code on the fly as the processor executes the computer program. However, in another methodology that generally provides for better performance, before a computer program is distributed to an end user, a compiler compiles, or translates, the source code to executable code, which a processor then executes.

SUMMARY

An example computer program product includes a computer readable storage medium having program instructions embodied therewith. The computer readable storage medium is not a transitory signal per se. The program instructions are executable by a processor to cause the processor to perform a method. The method includes providing source code for a function of a computer program to compilers. Each compiler compiles the source code for the function to an executable code variant for the function according to a different optimization approach. The executable code variant generated by each compiler is executable on a same processor architecture. The method includes receiving from the compilers the executable code variants generated by the compilers. The method includes constructing a binary file for the computer program including the executable code variant for the function generated by each compiler. At a particular runtime of the binary file on a target processor having the same processor architecture, one of the executable code variants is selected for utilization during the particular runtime. The method includes storing the binary file on a storage device for subsequent transmission to a computing device including the target processor.

An example computer-implemented method includes, in response to invocation of a binary file for a computer program to be executed, selecting, by a processor, one of a number of executable code variants for a function of the computer program included within the binary file to use during a current execution. The method includes, after selecting the one of the executable code variants, executing, by the processor, the computer program such that the selected executable code variant is executed every time the function is called within the computer program during the current execution. Each executable code variant is executable by the processor, and each executable code variant is a compiled version of source code for the function according to a different optimization approach.

An example system includes a processor and a storage device. The storage device stores a binary file for a computer program. The binary file has a text section including executable code variants for a function of the computer program. Each executable code variant is executable by the processor, and is a compiled version of source code for the function according to a different optimization approach. The binary file includes a branch table having an entry for the function that points to one of the executable code variants for utilization at runtime of the binary file. Upon invocation of the binary file to be executed, the processor is to choose a selected executable code variant for the function to use during execution of the binary file, update the entry within the branch table to point to the selected executable code variant, and execute the binary file for the computer program. The processor is to execute the binary file such that the selected executable variant is executed every time the function is called within the computer program until the execution of the binary file has been halted.

BRIEF DESCRIPTION OF THE DRAWINGS

FIG. 2 is a flowchart of an example method for generating the example binary file of FIG. 1.

FIG. 3 is a flowchart of an example method for executing the example binary file of FIG. 1.

FIG. 4 is a diagram of an example system by which the example methods of FIGS. 2 and 3 can be realized.

DETAILED DESCRIPTION

Figure 1:
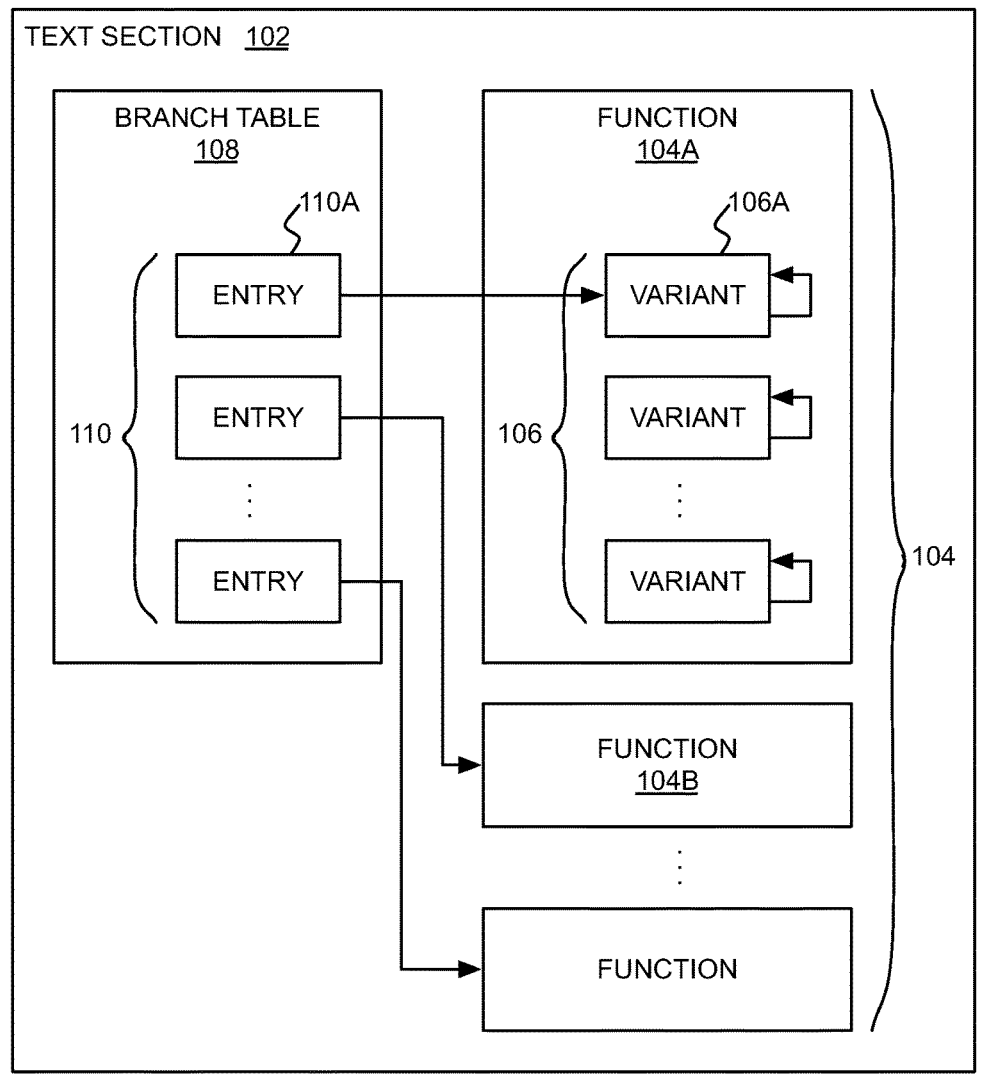
FIG. 1 is a diagram of an example binary file for a computer program including executable code variants for each of a number of different functions.

As noted in the background, a compiler can translate, or compile, source code of a computer program into binary code of the computer program. The compilation process permits a processor of a computing device to execute the computer program by specifically executing the binary code included within a binary file for the computer program. Different processors understand different types of binary code, according to their processor architectures, or instruction set architectures. For example, a processor that is compatible with an x86 instruction set architecture is not compatible with an ARM instruction set architecture.

While the same compiler or different compilers may be used to compile a computer program's source code into different binary code for different processor architectures, the same or different compilers may also compile source code into different binary code for the same processor architecture. Specifically, the same compiler or different compilers may compile source code into binary code according to different optimization approaches. Although the different binary code that is generated is compatible with the same processor architecture, the performance of each such binary code variant may differ depending on the optimization approach used. Such optimization approaches include loop unrolling, instruction reordering, common sub-expression elimination, dead code elimination, inline expansion, loop fusion, and so on.

A software developer thus has to choose a selected optimization approach from a variety of optimization approaches available, even when the developer knows the processor architecture on which his or her computer program will be run. Selecting the optimization approach—and thus the compiler—to use to compile source code into binary code that will yield the best performance is difficult or even impossible to accomplish a priori, however. At a minimum, the software developer has to have an understanding of how each optimization approach will affect the performance of the generated binary code, where different approaches may provide for different performance of the generated binary code depending on characteristics of the source code itself.

Even if the software developer has such a clear understanding, however, the developer may still be unable to select the optimization approach that will yield the best performing binary code. This is because given binary code may perform differently depending on the characteristics of the workload, or data, on which it is operative. If the workload or data rarely changes in its characteristics, the developer may be able to select the correct optimization approach if he or she understands the potentially complex interplay between the workload and the binary code variants that the various optimization approaches generate. However, if the workload or data changes in its characteristics over time—sometimes in ways that cannot be predicted beforehand—even if the software developer understands how different workload characteristics affect the binary code variants that the various optimization approaches generate perform, then the developer may not be able to select one optimal optimization approach for all such workload characteristic possibilities.

Disclosed herein are techniques that overcome these disadvantages. A computer program includes source code for a number of functions. Source code is a collection of computer instructions written in a human-readable computer language, usually as text, and which is translated or compiled into the binary code that a processor is able to understand and thus execute. A function, or subroutine, of a computer program is a sequence of instructions that perform a specific task, packaged as a unit, which can be used throughout the computer program within the same function or other functions, by calling an entry point into the function.

Compilers compile the source code for a function of the computer program into different executable code variants for the function according to different optimization approaches. Each variant is executable using the same processor architecture. That is, a target processor compatible with the processor architecture is able to execute each executable code variant for the function. A binary file for the computer program as a whole can include all the different executable code variants for each function. At each runtime of the binary file, a given variant for each function is selected from the variants available within the binary file to use throughout the current execution of the computer program, until the execution stops. That is, for a specific execution of the computer program from beginning to end, once a given variant for each function is selected, that variant is used throughout the execution in question, and is not reselected or changed to a different variant.

For example, the first threshold number of times a given computing device executes the computer program, the executable code variant for each function may be randomly selected from those available within the binary file. During each execution of the computer program, the device may monitor and log the performance of each executable code variant. Thereafter, when the computing device executes the computer program again, the device may select the executable code variant for each function that previously had the best performance.

In this way, the software developer of the computer program does not have to select which optimization approach to use for compiling each function of the computer program. Rather, the developer compiles each function using a number of different optimization approaches, to yield a corresponding number of different executable code variants for each function. As a given computing device executes the computer program, the device itself learns which variant for each function has the best performance, which can change over time as workload characteristics change. For computing devices having different processors compatible with the same instruction set architectures, as well as for different workloads, different executable code variants for each function may have the best performance.

FIG. 1 shows the structure of an example binary file 100 for a computer program. The binary file 100 is also referred to as an executable file. A processor of a computing device is able to directly execute the binary file 100 to execute the computer program, assuming that the processor is compatible with the processor architecture for which the binary file 100 was generated.

The binary file 100 can include a text section 102. The text section 102 is the section of the binary file 100 that stores the binary, or executable, code implementing the functionality of the computer program. The text section 102 may include a header ".text" to distinguish the section 102 from other sections of the binary file 100. An example of another section of the binary file 100 is a data section that stores data in relation to which the executable code is performed, and which may include the header ".data."

The text section 102 of the binary file 100 includes a number of functions 104, including the functions 104A and 104B. Description is made herein in specific relation to the function 104A, but this description applies to the other functions 104 as well. The function 104A includes executable code variants 106, including the executable code variant 106. The executable code variants 106 are each compatible with the same processor architecture. During a given execution of the computer program, just one executable code variant 106 is executed, although each executable code variant 106 implements or realizes the function 104A.

The text section 102 of the binary file 100 also includes a branch table 108. The branch table 108 has entries 110, including the entry 110A, which are for and correspond on a one-to-one basis to the functions 104. That is, for each of the functions 104, there is a corresponding and unique one of the entries 110 of the branch table 108. Description is made herein in specific relation to the entry 110A for the function 104A, but this description applies to the other entries 110 for the other functions 104 as well.

The function 104A points to an entry point of one of the executable code variants 106 for the function 104. The executable code variant 106 to which the entry 110A points within the branch table 108 is the variant 106 that is executed to implement the function 104A. In the example of FIG. 1, the entry 110A points to the executable code variant 106A. Therefore, the current execution of the binary file 100 for the computer program utilizes the executable code variant 106A, and not any other of the variants 106, as or for the function 104A.

During execution of the computer program, then, when a processor encounters a call within the computer program to the function 104A, the processor effectively references the entry 110A for the function to determine which of the executable code variants 106 to use. Stated another way, external calls to the function 104A within the computer program—such as when the function 104B calls the function 104A—do not directly reference the function 104A or any of its executable code variants 106. Rather, external calls to the function 104A within the computer program rather reference the entry 110A for the function 104A to determine which executable code variant 106 to use. An external call in this context is a call to the function 104A from within the computer program still, but not from within the function 104A itself.

However, internal calls to the function 104A within the computer program—such as when the function 104A recursively calls itself—can be handled differently. Each executable code variant 106, when recursively calling the function 104A, directly calls itself without referencing the entry 110A for the function 104A. FIG. 1 depicts this implementation by an arrow 112 pointing from and to the executable code variant 106A. When the executable code variant 106A calls the function 104A (i.e., itself), the variant 106A calls the variant 106A without referencing the entry 110A. An internal call in this context is a call to the function 104A from both within the computer program and within the function 104A itself.

As an example of the foregoing, execution of the binary file 100 for the computer program may result in the function 104B calling the function 104A, and then the function 104A calling itself. The function 104B is coded within the binary file 100 to refer to the entry 110A for the function 104A within the branch table 108 to call the function 104A. Because the entry 110A points to the executable code variant 106A for the function 104A, the function 104B thus calls the variant 106A. The executable code variant 106A is coded within the binary file 100 to refer to itself directly, and not refer to the entry 110A for the function 104A within the branch table 100 to call the function 104A (i.e., itself). When the function 104B calls the function 104A, the processor refers to the entry 110A and calls the executable code variant 106A. When the executable code variant 106A calls the function 104A, the processor calls itself directly without referring to the entry 110A. That is, calls to each executable code variant 106 from within the variant 106 refer directly to the same variant 106.

Therefore, each different execution of the binary file 100 for the computer program can result in a processor executing a different executable code variant for each function 104. The processor is able to execute all the executable code variants for each function 104, since the executable code variants for each function 104 are for the same processor architecture. As an example, the first time the binary file 100 is executed, the executable code variant 106A may be utilized for the function 104A, whereas the second time the binary file 100 is executed, a different executable code variant 106 may be utilized for the function 104. The entries 110 of the branch table 108 are not, however, modified or changed while the processor is currently executing the binary file 100.

FIG. 2 shows an example method 200 for generating the binary file 100 for the computer program. A processor of a computing device performs the method 200. This computing device is typically the computing device that a software developer is using to write the computer program. By comparison, a processor of a different computing device, that of an end user, typically but not necessarily executes the binary file 100 after generation.

To distinguish between these two computing devices and their constituent processors, the processor of the computing device performing the method 200 is referred to herein as the development processor of the development computing device. Similarly, the processor of the computing device that ultimately executes the generated binary file 100 is referred to herein as the target processor of the target computing device. The development processor does not have to be compatible with the same processor architecture that the target processor is. For example, the development processor may be compatible with an x86 instruction set architecture, but generate a binary file 100 that is compatible with an ARM instruction set architecture of the target processor. In this case, the development processor can generate the binary file 100 but not execute it.

The development processor compiles the source code for the computer program to generate executable code for the computer program (202). To accomplish this, the development processor can perform the following. First, the development processor provides the source code to a number of different compilers (204). The compilers may be running on the development computing device, or they may be running on one or more other computing devices. Second, the development processor receives executable code from each compiler (206).

More specifically, each compiler compiles the source code for each function of the computer program into executable code for that function. The different executable code that the compilers generate for the functions are the executable code variants for the functions. For instance, the different executable code that the compilers generate for the function 104A are the executable code variants 106 of the function 104A.

Each compiler generates its corresponding executable code variant for a function so that the variant is executable on the same processor architecture. As such, the target processor can execute each executable code variant of each function. Each compiler has a different optimization approach. Therefore, although each executable code variant for a function realizes the function and thus has the same operative effect, the executable code variants for the function are nevertheless different.

For instance, each optimization approach may provide for different execution times for the generated executable code variant, which is how long it takes for the target processor to execute the variant, based on various factors. One can include characteristics of the target computing device. For example, some executable code variants may be more memory intensive, others may be more processor intensive, and still others may be more network intensive. Therefore, the amount of memory, the type and/or speed of the target processor, and/or the available network bandwidth of the target computing device can affect how quickly the target computing device can execute different executable code variants.

Another factor includes characteristics of the workload in relation to which the target computing device executes an executable code variant. The workload is the data on which the executable code variant performs processing when the target processor executes the variant. Some executable code variants may be better suited for processing certain types of data, and other variants may be better suited for processing other types of data. As an example, one optimization approach may be better suited for generating an executable code variant for processing numeric data, whereas another approach may be better suited for generating a variant for processing text data. Therefore, the type of workload that the target computing device is to process can also affect how quickly the target computing device can execute different executable code variants.

Which optimization approach results in the best performing executable code variant for a function can thus be unknown or even unknowable at the time of compilation (and similarly, later when the development processor constructs the binary file). The software developer may not know the characteristics of the target computing device, and further, these characteristics can change in the future. Likewise, the software developer may not know the characteristics of the workload in relation to which the target computing device executes the computer program, and these characteristics can also change in the future.

Therefore, the development processor employs different compilers having different optimization approaches to generate different executable code variants for these functions. In one implementation, a given compiler has a corresponding optimization approach. In another implementation, a given compiler can have more than one optimization approach. In this latter scenario, the compiler in question can thus generate more than one executable code variant.

At 208, the development processor constructs the binary file 100 for the computer program (202). That is, the development processor includes the executable code variant for each function generated by each compiler within the binary file 100. The binary file 100 can be formatted as has been described above to include a text section 102 including these executable code variants, and a branch table 108 having entries 110 corresponding to the functions that each point to one executable code variant of a function.

Once the development processor has constructed the binary file 100 for the computer program, the development processor stores the binary file 100 on a storage device (210). Subsequently, the binary file 100 is transmitted to the target computing device for execution. For example, the software developer may cause the binary file 100 to be uploaded to a central server, from which users download the binary file 100 onto their target computing devices and execute the file 100 thereon.

FIG. 3 shows an example method 300 for executing the generated binary file 100 for a computer program. A processor of a computing device performs the method 300. This computing device is typically the computing device of an end user, and is referred to as the target computing device, having a target processor.

The target processor performs the method 300 at each runtime of the computer program. The run time of the computer program is when a user directly or indirectly requests that the target processor begin execution of the computer program, which is the current execution of the computer program. The target processor at some point in the future halts the current execution of the computer program, such as responsive to the user directly or indirectly requesting that the target processor quit running the program.

As such the target processor performs the method 300 responsive to invocation of execution of the binary file 100 for the computer program (302). The target processor selects an executable code variant for each function, from the variants present in the binary file 100, to use during the current execution of the computer program (304). In general, the target processor selects the executable code variant for each function that has the greatest likelihood of having the highest performance as compared to other variants for the function in question during the current execution.

In one implementation, the target processor selects the executable code variant for each function as follows. If the target processor of the target computing device itself has previously executed the computer program less than a threshold number of times (306), then the target processor randomly selects one of the executable code variants available within the binary file 100 for each function (308). If the target processor has already previously executed the computer program the threshold number of times (306), then the target processor instead selects the executable code variant for each function that historically has had the highest performance during prior executions of the computer program (310).

The specific implementation described in the previous paragraph allows the target processor to effectively test the executable code variants for each function over the first threshold number of times the target processor runs the computer program. Once the target processor has run the computer program the threshold number of times, the target processor can then select for subsequent executions of the computer program the executable code variant for each function that has proven to have the highest performance. Because the selection process can be restricted to performance results from prior executions of the computer program by the target processor itself, the target processor may select different executable code variants for the functions than a different processor of a different computing device might, which may have different characteristics or may be processing different types of workloads.

The target processor updates the entry within the branch table 108 for each function to point to the selected executable code variant for the function (312). For a given function, therefore, the selectable executable code variant to which the corresponding entry within the branch table 108 points is the variant that the target processor uses to perform the function during the current execution of the computer program. Until execution of the binary file 100 is halted, the target processor does not reselect or update the executable code variant of any function. This means that the target processor does not change any entry within the branch table 108 during the current execution.

The target processor thus executes the binary file 100 for the computer program using the selected executable code variants for the functions of the computer program (314). Particularly but not necessarily in the case in which the target processor selected the executable code variants by performing parts 306, 308, and 310, the target processor may monitor performance of each selected executable code variant while executing the computer program (316). Once the current execution of the program has been halted, the target processor may then store information regarding the performance of each selected variant within a data store residing on a storage device (318), which the target processor can use when performing part 310 the next time the program is run. The target processor may execute a monitoring computer program to perform parts 316 and 318.

The target processor can perform the executable code variant selection process of part 304 and the branch table entry updating process of part 312 in one of at least two different ways. First, the target processor can perform parts 304 and 312 by executing a helper computer program that is different than the computer program whose execution the end user invoked in part 302. In this implementation, when the end user invokes the execution of the computer program in part 302, the target processor first executes the helper computer program to perform parts 304 and 312, prior to executing the computer program itself at part 314.

Second, the selection and updating processes of parts 304 and 312 can be part of the computer program itself that the end user invoked in part 302. In this implementation, when the end user invokes the execution of the computer program in part 302, the target processor's execution of the computer program first results in execution of helper code within the program that performs parts 304 and 312. Thereafter, the helper code cedes execution to a primary part of the computer program. In this implementation, then, executing the binary file 100 in part 314 means executing the primary part of the computer program, where the target processor first executes the helper code to perform parts 304 and 312.

FIG. 4 shows an example system 400. The system 400 includes a development computing device 402 that a software developer uses to write the computer program having the binary file 100, and a target computing device 404 that an end user uses to run the binary file 100 for the computer program. The computing devices 402 and 404 may be desktop or laptop computers, for instance. The system 400 can include a server computing device 406 on which the software developer stores the binary file 100 after generation at the development computing device 402, and from which the end user downloads the binary file 100 for execution at the target computing device 404. In this example, the computing devices 402, 404, and 406 are communicatively connected to one another over a network 408, which may be the Ethernet, an intranet, an extranet, and so on.

The development computing device 402 includes at least a development processor 410, volatile memory 412, and a non-volatile storage device 416, as well as a network adapter 414 for connecting to the network 408 in the example of FIG. 4. The storage device 416 stores a binary file generation computer program 418 that the processor 410 executes, using the memory 412 as appropriate, to generate the binary file 100 for the computer program. The processor 410 executes the binary file generation computer program 418 to perform the method 200. The processor 410 executes the compilers 420 as called by the binary file generation computer program 418 to generate the executable code variants as has been described.

The target computing device 404 includes at least a target processor 422, volatile memory 424, and a storage device 428, as well as a network adapter 426 for connecting to the network 408. When the binary file 100 for the computer program is transferred to the storage device 428, the target processor 422 executes the binary file 100, using the memory 424 as appropriate, by performing the method 300. The storage device 428 in the example of FIG. 4 includes a helper computer program 430 and a monitoring computer program 432, which the target processor 422 executes using the memory 412 as appropriate, as well as a data store 434.

The helper computer program 430 permits the target processor 422 to select the executable code variant for each function of the binary file 100 at runtime, by performing parts 304 and 312 of the method 300. The monitoring program permits the target processor 422 to monitor performance of the selected executable code variants of the binary file 100, by performing part 316 of the method 300. The monitoring program further permits the target processor 422 to store performance results of the selected executable code variants within the data store 434 for future reference, by performing part 318 of the method 300.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

We claim:

1. A computer program product comprising a computer readable storage medium having program instructions embodied therewith, wherein the computer readable storage medium is not a transitory signal per se, the program instructions executable by a processor to cause the processor to perform a method comprising:
   providing source code for a function of a computer program to a plurality of compilers, each compiler compiling the source code for the function to an executable code variant for the function according to a different optimization approach that is optimized to a particular workload characteristic on which the function is operable, the executable code variant generated by each compiler executable on a same processor architecture, a computing device having a target processor having the same processor architecture able to execute the executable code variant generated by each compiler;
   receiving from the compilers the executable code variants generated by the compilers;
   constructing a binary file for the computer program including the executable code variant for the function generated by each compiler, wherein at a particular runtime of the binary file on the target processor having the same processor architecture, one of the executable code variants is selected for utilization during the particular runtime based on a characteristic of a workload on which the function is to operate, the target processor selecting different of the executable code variants for the function when executing a computer program in relation to workloads having characteristics; and
   storing the binary file on a storage device for subsequent transmission to a computing device including the target processor.

2. The computer program product of claim 1, wherein constructing the binary file comprises creating a text section including:
   the executable code variant for the function generated by each compiler; and
   a branch table having an entry for the function, the entry dynamically updated at the particular runtime to point to the one of the executable code variants selected for utilization during the particular runtime.

3. The computer program product of claim 2, wherein a call to the function within the computer program during the particular runtime references the entry for the function within the branch table to determine the one of the executable code variants to use during the particular runtime.

4. The computer program product of claim 2, wherein an external call to the function within the computer program outside of the function itself during the particular runtime references the entry for the function within the branch table to determine the one of the executable code variants to use during the particular runtime.

5. The computer program product of claim 4, wherein an internal call to the function within the computer program inside of the function itself during the particular runtime points to the one of the executable code variants directly without having to reference the entry for the function within the branch table.

6. The computer program product of claim 1, wherein once the one of the executable code variants is selected for utilization during the particular runtime, the selected executable code variant is used for the function during execution of the binary file for the computer program until the execution is halted.

7. The computer program product of claim 1, wherein the different optimization approach of each compiler provides for different execution time of the executable code variant based on one or more of:
   characteristics of the computing device including the target processor on which the binary file for the computer program is executed at the particular runtime; and
   characteristics of a workload in relation to which the binary file for the computer program is executed at the particular runtime on the computing device including the target processor.

8. The computer program product of claim 1, wherein which of the different optimization approaches of the compilers will result in a best performing one of the executable code variants for the function is unknown at a time of constructing the binary file for the computer program.

9. A computer-implemented method comprising:
   in response to invocation of a binary file for a computer program to be executed, selecting, by a processor, one of a plurality of executable code variants that are executable by the processor for a function of the computer program included within the binary file to use during a current execution, based on a characteristic of a workload on which the function is to operate; and after selecting the one of the executable code variants, executing, by the processor, the computer program such that the selected executable code variant is executed every time the function is called within the computer program during the current execution in relation to the workload having the characteristic, wherein each executable code variant is executable by the processor, and each executable code variant is a compiled version of source code for the function according to a different optimization approach, the executable code variant generated by a compiler executable on a same processor architecture, and the processor having the same processor architecture able to execute the executable code variant generated by the compiler, wherein the processor selects a different executable code variant for the function when executing the computer program in relation to another workload having a different characteristic.

10. The computer-implemented method of claim 9, further comprising:

monitoring, by the processor, performance of the selected executable code variant within the computer program while the computer program is being executed;

after execution of the computer program has been halted, storing, by the processor, information regarding the performance of the selected executable code variant within the computer program within a data store.

11. The computer-implemented method of claim 9, wherein selecting the one of the executable code variants for the function comprises:

in response to determining that the computer program has been previously executed by the processor less than a threshold number of times, randomly selecting the one of the plurality of executable code variants to use during execution of the binary code file in response to the invocation; and in response to determining that the computer program has been previously executed by the processor at least the threshold number of times, selecting the one of the plurality of executable code variants that had highest performance during prior executions of the computer program by the processor.

12. The computer-implemented method of claim 9, wherein selecting the one of the executable code variants for the function comprises:

selecting the one of the executable code variants for the function that has a greatest likelihood of having highest performance during execution of the computer program.

13. The computer-implemented method of claim 9, wherein selecting the one of the executable code variants is performed by a different computer program executed by the processor in response to the invocation of the binary file, prior to execution of the binary file for the computer program.

14. The computer-implemented method of claim 9, wherein selecting the one of the executable code variants is performed by the computer program itself as executed by the processor, prior to execution of a primary part of the computer program.

15. The computer-implemented method of claim 9, wherein the binary file comprises a branch table having an entry for the function, and wherein the method further comprises, after the one of the executable code variants has been selected and before the computer program is executed, updating the entry for the function to point to the selected executable code variant for the function.

16. The computer-implemented method of claim 15, wherein during execution of the computer program by the processor, a call to the function within the computer program references the entry for the function within the branch table to determine the one of the executable code variants to use.

17. The computer-implemented method of claim 15, wherein during execution of the computer program by the processor, an external call to the function within the computer program outside of the function itself references the entry for the function within the branch table to determine the one of the executable code variants to use.

18. The computer-implemented method of claim 17, wherein during execution of the computer program by the processor, an internal call to the function within the computer program inside the function itself points to the one of the executable code variants directly without having to reference the entry for the function within the branch table.

19. The computer-implemented method of claim 9, wherein after the one of the executable code variants has been selected and the computer program has begun to be executed, the selected executable code variant is used for the function during execution of the binary file for the computer program until the execution is halted.

20. A system comprising:

a processor; and a storage device storing a binary file for a computer program having:

a text section including a plurality of executable code variants for a function of the computer program, each executable code variant executable by the processor, each executable code variant being a compiled version of source code for the function according to a different optimization approach, the executable code variant generated by a compiler executable on a same processor architecture, and the processor having the same processor architecture able to execute the executable code variant generated by the compiler; and a branch table having an entry for the function, the entry pointing to one of the executable code variants for utilization at runtime of the binary file, wherein upon invocation of the binary file to be executed, the processor is to:

choose a selected executable code variant for the function to use during execution of the binary file based on a characteristic of a workload on which the function is operable;

update the entry within the branch table to point to the selected executable code variant; and execute the binary file for the computer program such that the selected executable variant is executed every time the function is called within the computer program until the execution of the binary file has been halted.

* * * * *